April 26, 1960

C. D. ALBERTS 2,933,827

EDUCATIONAL DEVICE

Filed July 26, 1956

INVENTOR.
CECIL DARWIN ALBERTS
BY
Lyon & Lyon
ATTORNEYS.

United States Patent Office 2,933,827
Patented Apr. 26, 1960

2,933,827

EDUCATIONAL DEVICE

Cecil Darwin Alberts, Hermosa Beach, Calif.

Application July 26, 1956, Serial No. 600,338

2 Claims. (Cl. 35—8)

The present invention relates to systems and apparatus aiding in the retention of school subject matter, and is a continuation-in-part of my previous application, Serial No. 458,813, filed September 28, 1954, now abandoned.

In recent years it has been increasingly important to parents and teachers to raise the standard of performance of children in school. The numerous subjects required to be taught and the multitude of methods utilized have no doubt made the assimilation of this material difficult for children. What was needed was an adaptable method of any subject matter.

The present invention provides a reinforcing means of giving concentrated attention to a particular subject and simplifying that subject to its bare essentials, whether as words, symbols, numbers, or letters. It provides a means of causing children to repeatedly associate one item with another until the association is firmly fixed in the memory.

Further objects of the invention are to provide a teaching tool quickly adaptable to the classroom situation and motivating new learning in the form of a game.

Another object of the invention was to allow a means for building retention of subject matter in preparation for formal classroom test and adapting easily to that testing program.

Another object of the invention is to allow easy creation of original games by class and teacher.

With the above and other objects in view, as may appear hereinafter, reference is directed to the accompanying drawings in which.

Figure 1:
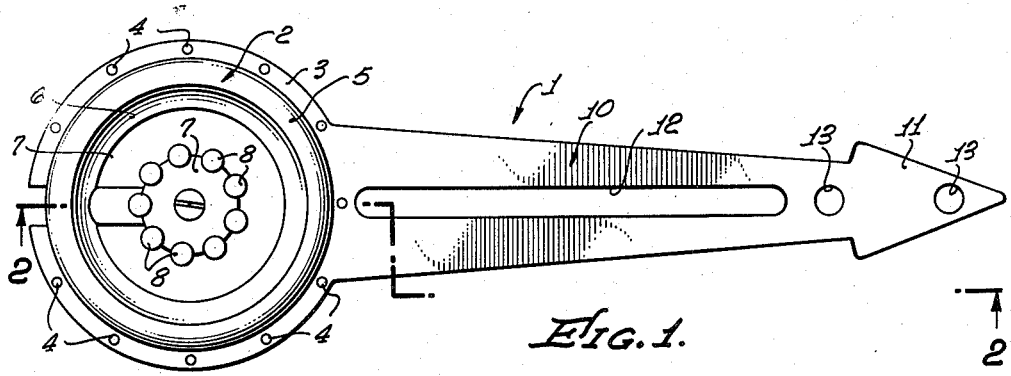
Figure 1 is a top or plan view of the educational device.
Figure 2:
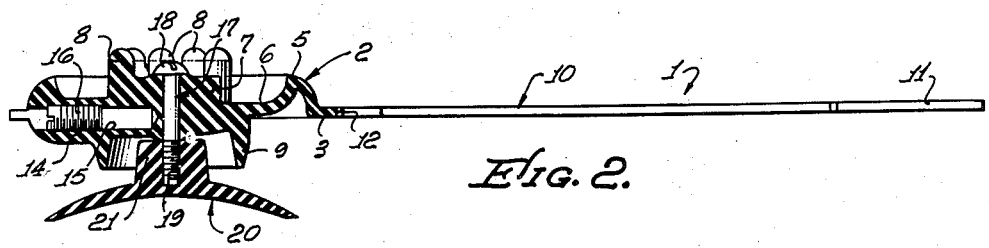
Fig. 2 is a partial sectional, partial side view thereof, taken through 2—2 of Fig. 1.
Figure 3:
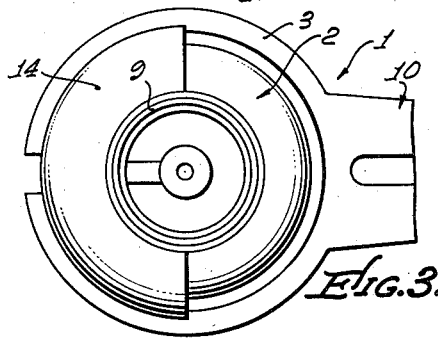
Fig. 3 is a fragmentary bottom view thereof.

The educational device includes a rotatable member 1 having a relatively large flat hub 2. The hub is provided with a narrow marginal flange 3 having equally spaced protractor markings 4 thereon. Inwardly from the flange 3, the outer side of the hub is provided with a rim 5 within which is formed a depressed portion 6. Centered in the depressed portion is a handle boss 7 having a ring of gripping knobs 8. The opposite or inner side of the hub is provided with a skirt 9.

Extending from one side of the marginal flange 3 and formed integrally therewith is a pointer blade 10 terminating in a pointer head or tip 11. The pointer blade is provided with a radial slot 12, and its extended end is provided with a pair of perforations 13.

The underside of the hub 2, opposite from the pointer blade 10, is provided with an integral fixed counterweight 14 formed by molding a semi-circular boss in the region radially outward from the skirt 9. The fixed counterweight portion 14 is provided with a radial bore 15 which receives a trimming counterweight 16. The entire rotatable member 1, which is molded as a single piece, is preferably formed of rubber or rubber-like material. The trimming counterweight 16 may be in the form of a set screw. However, by reason of the fact that the rotatable member is molded of rubber or the like the walls of the radial bore 15 need not be internally screw-threaded; instead, the trimming counterweight may be merely forced therein and held in place by the resiliency of the material comprising the rotatable member.

The hub 2 is provided with a central journal bore which receives a journal pin 17, which as will be hereinafter seen forms an axle for rotatably supporting the member 1. In the molding of the rotatable member 1, that portion which forms the central part of the hub may be impregnated with graphite or the like and so improve the bearing qualities. However, this is not absolutely essential, as a free running fit between the hub and the journal pin 17 is sufficient for operation of the device. The journal pin 17 is provided with a head 18 at the outer side of the hub 2 and is screw-threaded at its inner end 19. The ends of the hub 2 surrounding the bore may be provided with raised bearing bosses.

The rotatable member 1 may be mounted on a vertical surface by means of a suction cup 20 having a central boss 21 in which is formed a socket to receive the screw-threaded end 19 of the journal pin 17. The suction cup is molded of rubber or similar material. The socket in the boss 21 need not be cast with screw threads inasmuch as the walls yield to conform to the screw threads of the journal pin 17.

The journal pin 17 may be adjusted so as to allow slight axial play of the hub 2 and permit free rotation of the rotatable member 1 relative to the suction cup 20. If desired, however, the journal pin may be tightened so that the hub 2 frictionally engages the boss 21 of the suction cup 20, thus enabling the rotatable member to be moved to any desired fixed position.

In the use of the device as an educational aid, the teacher may determine the number of items necessary for the class or group to remember, introduce the subject in the usual way with lectures, film, demonstration, pictures, etc., and provide each child with a list of items and the correct association for each item.

Figure 5:
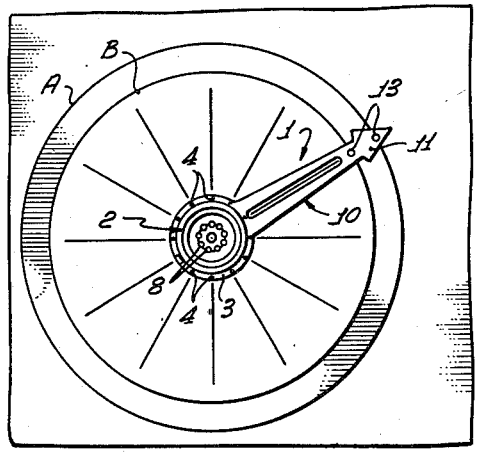
Fig. 5 is a substantially diagrammatical plan view, illustrating the manner in which circles and radial lines may be drawn by the device.

The protractor markings 4 are used to aid in spacing the radial markings equally, as shown in Fig. 5, or in any desired arrangement.

The device is initially used to draw upon the blackboard an appropriate number of segments. Thereupon one child may spin the pointer blade 10 and another child keep score. As the spinner stops and points to a word written in one of the segments, the children respond with the needed association. After the spinner repeatedly stops at any point, that particular association is reinforced and the answer sheet previously provided for each child may be withdrawn. Especially easy items may be removed from the game and the practice of remembering continued with more difficult ones.

The general reaction of a class to new material may be used as a clue to the need for additional introductory explanations or material and serves to diagnose class progress. Formal or informal testing is a further advantage of this device, as the class is required to write their associations on paper for grading. The versatility of this device is apparent in the fact that it is at present being used to reinforce the following subjects: reading, social studies, arithmetic, science, music, language, and foreign languages. It may be also adapted for special correction of mentally retarded and cerebral palsied classes.

Figure 4:
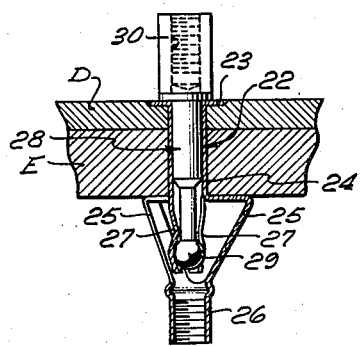
Fig. 4 is a fragmentary sectional view, showing a modified means of mounting the educational device on a vertical surface.

If the device is to be used at a fixed location on a blackboard or other drawing surface, an expansion type screw anchor 22 may be fitted into a hole bored into such surface, as shown in Fig. 4. In this case the screw anchor after being set into a blackboard D is backed by a suitable support member E. The screw anchor may be in most respects conventional and may comprise a flanged outer end 23, a sleeve 24, expandable locking arms 25, shown expanded in the drawing and a screw-threaded nipple 26 which is initially employed with a screw member, not shown, to compress the screw anchor axially so as to deform or expand the locking arms 25.

Secured within or forming a part of the screw anchor 22 are spring clips 27. An anchor pin 28 is adapted to be inserted through the sleeve 24. The anchor pin terminates in a ball end 29 adapted to be yieldably retained by the spring clips 27. The outer end of the anchor pin 28 is provided with a screw-threaded socket 30 which receives the screw-threaded end 19 of the journal pin 17.

It should be noted that the pointer is relatively flexible and that while it normally clears the blackboard, it may be deflected close to the board so that short pieces of chalk may be used in the perforations 13 and at least the outer portions of the slot 12.

While a particular embodiment of this invention has been shown and described, it is not intended to limit the same to the exact details of the construction set forth, and it embraces such changes, modifications, and equivalents of the parts and their formation and arrangement as come within the purview of the appended claims.

I claim:

1. An educational device adapted to be mounted to a vertical display member, comprising: anchor means for removably mounting said device to a vertical display member; an axle projecting from said anchor means and adapted to extend horizontally therefrom when said anchor means is mounted to a vertical display member; a hub member rotatably mounted to said axle; means operable at will for selectively holding said hub in a preselected position relative to said axle and thereby to maintain said pointer; a pointer blade carried by said hub member and extending radially of the axis of the rotation of said hub member; an upstanding knob formed integral with said hub member for manually rotating said hub member and blade; fixed weight means carried by said hub member for counter-balancing said pointer blade; and a trimming counter-balancing weight movably carried by said hub and movable to accurately counter-balance said hub, whereby said hub member when manually rotated will produce random positioning of said pointer blade relative to said display member to which said educational device is mounted.

2. An educational device adapted to be mounted to a vertical display member, comprising: anchor means for removably mounting said device to a vertical display member; an axle projecting from said anchor means and adapted to extend horizontally therefrom when said anchor means is mounted to a vertical display member; a hub member rotatably mounted to said axle; a pointer blade carried by said hub member and extending radially of the axis of the rotation of said hub member; means carried by said hub member and forming a manually actuatable element for rotating said hub member and blade; and means carried by said hub member of such a weight and at such a spatial location thereon for counter-balancing said pointer blade whereby said hub member when manually rotated will, at cessation of rotation, produce random positioning of said pointer blade relative to said display member to which said educational device is mounted, said last named means including a movable element to be moved into a predetermined position to accurately counterbalance said hub.

References Cited in the file of this patent

UNITED STATES PATENTS

| 1,179,813 | Eisele et al. | Apr. 18, 1916 |
| 1,571,777 | Golden | Feb. 2, 1926 |
| 2,025,942 | Dunwoody | Dec. 31, 1935 |
| 2,062,157 | Beshimol | Nov. 24, 1936 |
| 2,088,951 | Fry | Aug. 3, 1937 |
| 2,104,515 | Golden | Jan. 4, 1938 |
| 2,538,601 | Taylor et al. | Jan. 16, 1951 |
| 2,556,518 | Bryngelson | June 12, 1951 |
| 2,581,839 | Douglas | Jan. 8, 1952 |

FOREIGN PATENTS

| 450,893 | Great Britain | July 27, 1936 |
| 130,506 | Switzerland | Feb. 16, 1929 |